(12) United States Patent
Li et al.

(10) Patent No.: US 11,445,398 B2
(45) Date of Patent: Sep. 13, 2022

(54) METHODS, APPARATUS AND SYSTEMS FOR CONFIGURING MINIMIZATION OF DRIVE TEST UNDER A MULTI-CONNECTIVITY ARCHITECTURE

(71) Applicant: ZTE CORPORATION, Guangdong (CN)

(72) Inventors: Dapeng Li, Shenzhen (CN); He Huang, Shenzhen (CN); Yin Gao, Shenzhen (CN)

(73) Assignee: ZTE CORPORATION

( * ) Notice: Subject to any disclaimer, the term of this patent is extended or adjusted under 35 U.S.C. 154(b) by 0 days.

(21) Appl. No.: 17/017,498

(22) Filed: Sep. 10, 2020

(65) Prior Publication Data
US 2021/0067998 A1 Mar. 4, 2021

Related U.S. Application Data

(63) Continuation of application No. PCT/CN2018/078683, filed on Mar. 12, 2018.

(51) Int. Cl.
*H04W 24/10* (2009.01)
*H04W 76/15* (2018.01)
(Continued)

(52) U.S. Cl.
CPC ......... *H04W 24/10* (2013.01); *H04L 41/0803* (2013.01); *H04W 24/02* (2013.01); *H04W 72/04* (2013.01); *H04W 76/15* (2018.02)

(58) Field of Classification Search
CPC ..... H04W 24/10; H04W 76/15; H04W 24/02; H04W 72/04; H04L 41/0803
See application file for complete search history.

(56) References Cited

U.S. PATENT DOCUMENTS

2011/0250910 A1\* 10/2011 Lee ................. H04W 24/10
455/466
2013/0010631 A1\* 1/2013 Jung ................. H04W 16/18
370/252
(Continued)

FOREIGN PATENT DOCUMENTS

CN 102291756 A 12/2011
CN 102612072 A 7/2012
(Continued)

OTHER PUBLICATIONS

Extended European Search Report for EP Appl. No. 18909949.2 dated Jan. 13, 2021 (10 pages).
(Continued)

*Primary Examiner* — Umair Ahsan
(74) *Attorney, Agent, or Firm* — Foley & Lardner LLP

(57) ABSTRACT

Methods, apparatus and systems for configuring minimization of drive test in a wireless network with a multi-connectivity architecture are disclosed. In one embodiment, a method performed by a first wireless communication node is disclosed. The method comprises: transmitting, to a second wireless communication node, configuration information for a minimization of drive test (MDT) measurement; and receiving, from the second wireless communication node, a feedback in response to the configuration information for the MDT measurement. The first wireless communication node and the second wireless communication node are both nodes in a wireless network.

18 Claims, 10 Drawing Sheets

(51) Int. Cl.
*H04W 24/02* (2009.01)
*H04W 72/04* (2009.01)
*H04L 41/0803* (2022.01)

(56) References Cited

U.S. PATENT DOCUMENTS

2017/0208491 A1* 7/2017 Xu .................. H04W 24/10
2018/0063737 A1* 3/2018 Yamine ............ H04W 24/10

FOREIGN PATENT DOCUMENTS

| | | |
|---|---|---|
| CN | 102740277 A | 10/2012 |
| CN | 103813379 A | 5/2014 |
| EP | 3 172 913 B1 | 5/2017 |
| WO | WO-2012/046999 A2 | 4/2012 |
| WO | WO-2012/047070 A2 | 4/2012 |
| WO | WO-2013/042887 A1 | 3/2013 |
| WO | WO-2014/113141 A1 | 7/2014 |
| WO | WO-2016/012053 A1 | 1/2016 |

OTHER PUBLICATIONS

International Search Report and Written Opinion for PCT Appl. No. PCT/CN2018/078683 dated Nov. 22, 2018 (6 pages).
First Office Action for CN Appl. No. 201880091120.3, dated Jul. 2, 2021 (7 pages).
ZTE: "Logged MDT under IDC interference" 3GPP TSG-RAN WG2#92; R2-156236; Nov. 16-20, 2015, Anaheim, USA (3 pages).
First Office Action for JP Appl. No. 2020-548710, dated Feb. 1, 2022 (with English translation, 6 pages).

* cited by examiner

METHODS, APPARATUS AND SYSTEMS FOR CONFIGURING MINIMIZATION OF DRIVE TEST UNDER A MULTI-CONNECTIVITY ARCHITECTURE

CROSS-REFERENCE TO RELATED APPLICATION

This application claims the benefit of priority under 35 U.S.C. § 120 as a continuation of PCT Patent Application No. PCT/CN2018/078683, filed on Mar. 12, 2018, the disclosure of which is incorporated herein by reference in its entirety.

TECHNICAL FIELD

The disclosure relates generally to wireless communications and, more particularly, to methods, apparatus and systems for configuring a minimization of drive test function in a wireless network with a multi-connectivity architecture.

BACKGROUND

For network optimization of a present mobile communication system, a drive test is usually used to check whether the coverage quality and the system performance achieve desired design requirements. In a conventional drive test, professional people, e.g. network optimizers, drive vehicles along random routes. Each of them uses a measurement terminal to record events and measurement values along the route, and provides the records to the operator for network optimization. This process requires significant labor and time, which imposes a heavy burden for the network operator to build and maintain the network.

In order to reduce the cost and complexity of a manual drive test, the Third Generation Partnership Projects (3GPP) introduces a Minimization of Drive Test (MDT) function in Universal Terrestrial Radio Access Network (UTRAN) and Evolved UTRAN (E-UTRAN) release-10 version. The UTRAN includes base station Node B and radio network controller (RNC). The E-UTRAN includes evolved base station eNB. The core network (CN) corresponding to the UTRAN includes a Home Subscriber Server (HSS), a Mobile Switching Center (MSC) server, a serving GPRS (general packet radio service) support node (SGSN), etc. The CN corresponding to the E-UTRAN includes an HSS, a Mobile Management Entity (MME), etc. The MDT function automatically collects measurement information by a user equipment (UE) or a terminal, and reports the measurement information to a radio access network (RAN) through a control plane signaling. For a UTRAN system, the measurement information is reported to an RNC; for an E-UTRAN system, the measurement information is reported to an eNB. Then the measurement information is reported to a Trace Collection Entity (TCE) of an Operation and Maintenance (OAM) system through the RAN for network optimization, e.g. for discovering and solving the network coverage issue.

In addition, the MDT function can be used to collect wireless measurement information in areas, e.g. indoor areas and private areas, where a manual drive test cannot reach. But existing technology on MDT focuses merely on a drive test in a wireless network under a single-connectivity architecture, where a terminal connects merely to a single base station for service. Thus, existing systems and methods for configuring MDT in a wireless network are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first wireless communication node is disclosed. The method includes: transmitting, to a second wireless communication node, configuration information for a minimization of drive test (MDT) measurement; and receiving, from the second wireless communication node, a feedback in response to the configuration information for the MDT measurement. The first wireless communication node and the second wireless communication node are both nodes in a wireless network.

In a further embodiment, a method performed by a first wireless communication node is disclosed. The method includes: transmitting, to a second wireless communication node, a request for a minimization of drive test (MDT) measurement; receiving, from the second wireless communication node, a configuration message for the MDT measurement; and transmitting, to the second wireless communication node, a feedback in response to the configuration message. The first wireless communication node and the second wireless communication node are both nodes in a wireless network.

In another embodiment, a method performed by a first wireless communication node is disclosed. The method includes: receiving, from a second wireless communication node, configuration information for a minimization of drive test (MDT) measurement; transmitting, to the second wireless communication node, a feedback in response to the configuration information for the MDT measurement. The first wireless communication node and the second wireless communication node are both nodes in a wireless network.

In yet another embodiment, a method performed by a first wireless communication node is disclosed. The method includes: receiving, from a second wireless communication node, a request for a minimization of drive test (MDT) measurement; transmitting, to the second wireless communication node, a configuration message for the MDT measurement; and receiving, from the second wireless communication node, a feedback in response to the configuration message. The first wireless communication node and the second wireless communication node are both nodes in a wireless network.

In a different embodiment, a wireless communication node configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
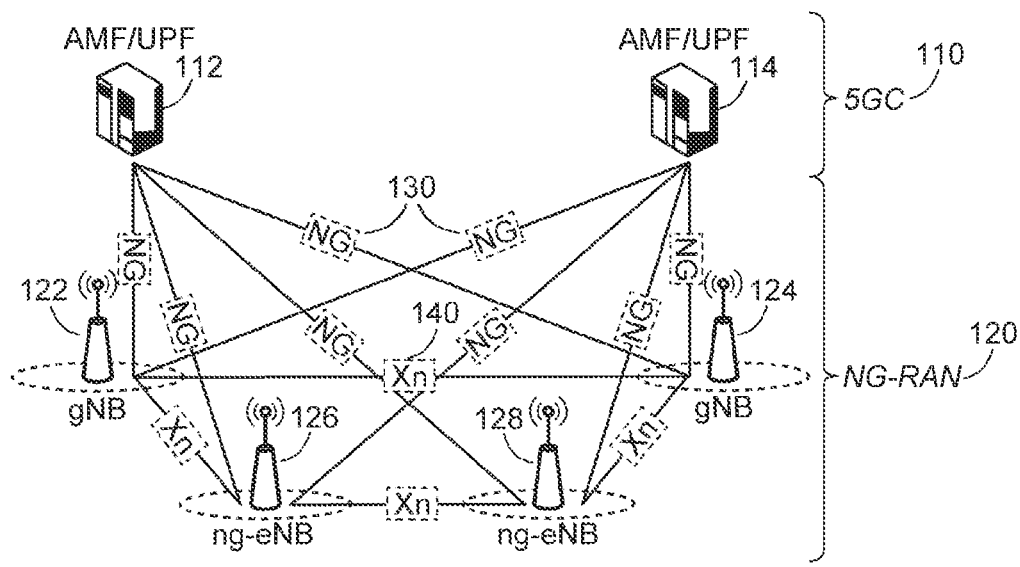
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Multi-connectivity architecture and minimization of drive test are important features in mobile communication systems. A typical wireless communication network includes one or more base stations (typically known as a "BS") that each provides a geographical radio coverage (a cell), and one or more wireless user equipment devices (typically known as a "UE") that can transmit and receive data within the radio coverage. Under a multi-connectivity architecture, a plurality of micro cell clusters may be distributed in a macro cell. A terminal may maintain a data connection with one or more micro cells while maintaining a data connection with the macro cell. That is, under a multi-connectivity architecture, a terminal can connect to multiple access-side network elements, e.g. multiple base stations, to obtain services. A minimization of drive test (MDT) function enables network operators to automatically obtain measurement data and optimize the network based on the measurement data.

The present disclosure provides methods for configuring an MDT measurement in a multi-connectivity architecture. Each network element (NE) participating in the MDT can independently determine how to trigger the measurement. A telecommunications network at the physical layer includes many interconnected wireline NEs. These NEs can be stand-alone systems or products that are either supplied by a single manufacturer or are assembled by the service provider with parts from several different manufacturers. In a wireless network, an NE is a node, a base station, or any product used by a wireless carrier to provide support for the backhaul network as well as a mobile switching center. Under a multi-connectivity architecture, an NE may be a master node (MN) or a secondary node (SN). In one embodiment, a first wireless communication node transmits configuration information for a MDT measurement to a second wireless communication node; and receives, from the second wireless communication node, a feedback in response to the configuration information for the MDT measurement. The two wireless communication nodes may be two nodes, e.g. two network elements MN and SN, of a same wireless network with a multi-connectivity architecture.

In addition to configuring the measurement at an NE itself, each NE can also allocate part of the MDT measurement to other NEs. For example, an MN may allocate the base station side measurement configuration of the MDT to the MN base station to implement, give the terminal side measurement to the terminal through a control plane of the SN, and give the positioning measurement configuration to the SN base station. After the MDT measurement is completed, the SN collects the measurement results of the terminal and the SN base station and reports the measurement results to the MN according to the configuration information, or collects the measurement results of the terminal and the SN base station according to the configuration and reports the measurement results to the TCE device. The configuration information for the MDT measurement comprises information related to at least one of: measurement objects of the MDT measurement; measured values of the MDT measurement; a location measurement manner; link direction of the MDT measurement; a location measurement provider; trace collection entity device information; operator information; one or more MDT measurement collection locations; one or more network elements that report the MDT measurement result; measurement type of the MDT measurement; base station information that triggers the MDT measurement; and network management information of the base station that triggers the MDT measurement.

The feedback, in response to the configuration information for the MDT measurement, may comprise a confirmation of the configuration information for the MDT measurement, or a conflict indication indicating that the second wireless communication node has triggered an existing MDT measurement, which is the same as the MDT measurement, on a same wireless communication device or terminal. A conflict may happen when multiple NEs respectively perform a same type of MDT measurement for a same UE. For example, an MN triggers a signaling-based MDT measurement on a certain terminal, while at the same time the network management of the SN base station triggers a management-based MDT on the terminal. As such, the MN and the SN select the same measurement on the same terminal. The disclosed method solves this conflict through a negotiation or a predetermined agreement between the two base stations MN and SN.

In an exemplary method to avoid a conflict between two nodes, a first wireless communication node transmits a request for an MDT measurement to a second wireless communication node; receives a configuration message for the MDT measurement from the second wireless communication node; and transmits a feedback in response to the configuration message to the second wireless communication node. The two wireless communication nodes may be two nodes, e.g. two network elements MN and SN, of a same wireless network with a multi-connectivity architecture. The request may comprise a first measurement configuration for the MDT desired by the first node; while the configuration message transmitted by the second node may comprise a second measurement configuration that is same as or different from the first measurement configuration, depending on whether there is an MDT conflict between the two nodes, i.e. whether the second node has triggered or desires another MDT measurement to be executed on a same terminal as the MDT measurement desired by the first node.

In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), a network element (NE), etc.; while a UE in the present disclosure can be referred to as a terminal and can include, or be implemented as, a mobile station (MS), a station (STA), etc. Under a multi-connectivity architecture, an NE may be a master node (MN) or a secondary node (SN). A BS and a UE may be described herein as non-limiting examples of "wireless communication nodes," and "wireless communication devices" respectively, which can practice the disclosed methods and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. In one embodiment, the exemplary communication network 100 has a Fifth Generation (5G) architecture, which includes a 5G core network (5GC) 110 portion and a next generation radio access network (NG-RAN) 120 portion. As shown in FIG. 1, the 5GC portion 110 includes mobility management function (AMF) and user plane function (UPF) 112, 114; while the NG-RAN portion 120 includes gNBs 122, 124 and/or ng-eNBs 126, 128. The interfaces between the 5G access network 120 and the 5G core network 110 are NG interfaces 130. The gNBs 122, 124 and ng-eNBs 126, 128 may communicate via inter-base station control plane interfaces such as an Xn interface 140 or an X2 interface.

Figure 2:
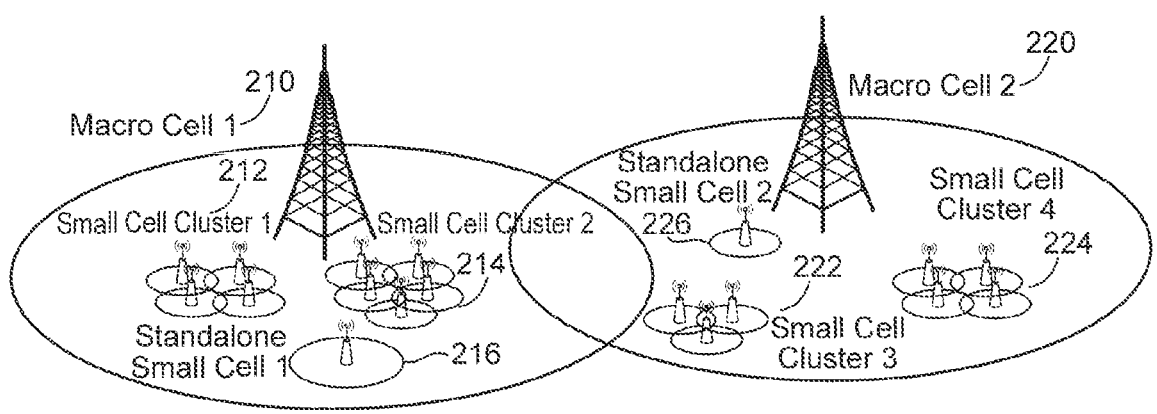
FIG. 2 illustrates an exemplary wireless network with a multi-connectivity architecture in which techniques disclosed herein may be implemented, in accordance with an embodiment of the present disclosure.

FIG. 2 illustrates an exemplary wireless network 200 with a multi-connectivity architecture in which techniques disclosed herein may be implemented, in accordance with an embodiment of the present disclosure. With the deployment of networks and the enhancement of terminal capabilities, a terminal can be connected to multiple base stations for service. As shown in FIG. 2, a plurality of micro or small cell clusters 212, 214, 216 are distributed in a macro cell 1 210; while a plurality of micro or small cell clusters 222, 224, 226 are distributed in a macro cell 2 220. A terminal may maintain a data connection with one or more micro cells while maintaining a data connection with a macro cell. This architecture is called a multi-connectivity architecture.

Dual connectivity (DC) has been standardized to enable a UE to establish two simultaneous and independent radio link (RL) connections with the master base station (Mng-eNB/gNB) and the secondary base station (Sng-eNB/gNB) respectively. The UE may be configured with a master cell group (MCG) bearer, a secondary cell group (SCG) bearer, or a split bearer. In one embodiment, the split bearer supports only the downlink data offload. In this case, the UE may simultaneously obtain DRB (Data Radio Bearer) services provided by two inter-frequency non co-site base station radio resources. The enhanced dual connectivity (eDC) is further standardized to allow the UE to establish two independent RL connections with the Mng-eNB/gNB and the Sng-eNB/gNB at the same time. The UE can further configure a split bearer to complement the uplink offload. In this case, the UE can simultaneously obtain the DRB services provided by two inter-frequency non co-site base station radio resources. Support can be given to a certain mobility scenario, e.g., switching between different Mng-eNBs/gNBs while keeping the Sng-eNB/gNB connections unchanged.

An MDT measurement may be configured under the multi-connectivity architecture shown in FIG. 2. An MDT function enables network operators to automatically obtain measurement data and optimize the network based on the measurement data. The MDT function may be divided into a management-based MDT and a signaling-based MDT. Taking the E-UTRAN system as an example, the activation process of the management-based MDT usually includes that: an OAM transmits a trace session activation message including the MDT configuration to the eNB; the eNB selects a suitable UE within the area specified by the message and transmits the MDT configuration information to the selected UE. The activation process of the signaling-based MDT includes that: the OAM transmits a trace session activation message including an MDT configuration to an HSS to activate MDT measurement of a designated UE; the HSS transmits the MDT configuration information of the UE to the MME; and the MME transmits the MDT configuration information of the UE to the eNB; and finally the eNB transmits the MDT configuration information to the UE. The signaling-based MDT usually designates a certain UE with an International Mobile Subscriber Identity (IMSI) or an International Mobile Equipment Identity (IMEI), or adds area information to restrict the UE selection. The activation message of the management-based MDT and the signaling-based MDT includes trace reference information from the OAM, including public land mobile network (PLMN) information, which includes mobile country code and mobile network code.

Figure 3:
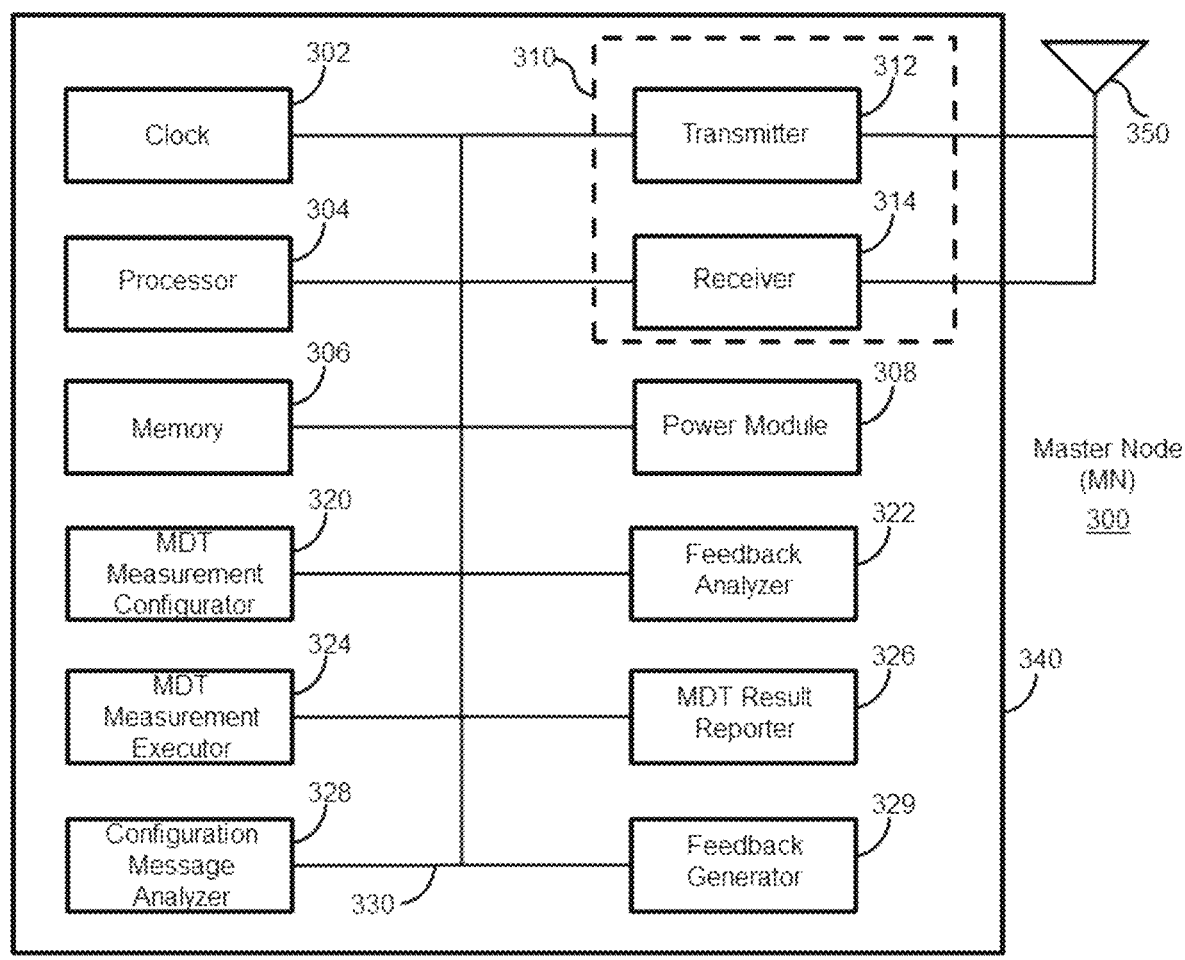
FIG. 3 illustrates a block diagram of a master node (MN), in accordance with some embodiments of the present disclosure.

FIG. 3 illustrates a block diagram of a master node (MN) 300, in accordance with some embodiments of the present disclosure. The MN 300 is an example of a node that can be configured to implement the various methods described herein. As shown in FIG. 3, the MN 300 includes a housing 340 containing a system clock 302, a processor 304, a memory 306, a transceiver 310 comprising a transmitter 312 and receiver 314, a power module 308, an MDT measurement configurator 320, a feedback analyzer 322, an MDT measurement executor 324, an MDT result reporter 326, a configuration message analyzer 328, and a feedback generator 329.

In this embodiment, the system clock 302 provides the timing signals to the processor 304 for controlling the timing of all operations of the MN 300. The processor 304 controls the general operation of the MN 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the MN 300 to transmit and receive data to and from a remote device (e.g., the BS or another UE). An antenna 350 is typically attached to the housing 340 and electrically coupled to the transceiver 310. In various embodiments, the MN 300 includes (not shown) multiple transmitters, multiple receivers, and multiple transceivers. In one embodiment, the antenna 350 is replaced with a multi-antenna array 350 that can form a plurality of beams each of which points in a distinct direction. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a wireless network with a multi-connectivity architecture, the MN 300 may configure an MDT measurement alone or with an SN in the wireless network. For example, the MDT measurement configurator 320 may generate configuration information for an MDT measurement and transmit, via the transmitter 312, the configuration information to another wireless communication node, e.g. an SN. The MN 300 and the SN are both nodes in the wireless network. In one embodiment, the MDT measurement is to be executed by a wireless communication device, e.g. a terminal or a UE, in the wireless network. In another embodiment, the MDT measurement comprises a first portion to be executed by the MN 300, a second portion to be executed by the SN, and a third portion to be executed by a terminal in the wireless network. In this case, the MDT measurement configurator 320 may merely transmit the second portion to the SN; or transmit both the second portion and the third portion to the SN, where the SN can forward the third portion to the terminal. The configuration information for the MDT measurement comprises information related to at least one of: measurement objects of the MDT measurement; measured values of the MDT measurement; a location measurement manner; link direction of the MDT measurement; a location measurement provider; trace collection entity device information; operator information; one or more MDT measurement collection locations; one or more network elements that report the MDT measurement result; measurement type of the MDT measurement; base station information that triggers the MDT measurement; and network management information of the base station that triggers the MDT measurement.

In one embodiment, to avoid an MDT conflict between the MN 300 and the SN, the MDT measurement configurator 320 can first transmit a request for the MDT measurement to the SN. The request comprises configuration information for the MDT measurement to notify the SN that the MN 300 desires to trigger the MDT measurement according to the configuration information. The MDT measurement configurator 320 may inform the feedback analyzer 322 that a request or a configuration message has been sent to and a feedback is expected from the SN.

The feedback analyzer 322 in this example may receive, via the receiver 314 from the SN, a feedback in response to the configuration information for the MDT measurement. The feedback analyzer 322 analyzes the feedback to determine whether the feedback comprises a confirmation of the configuration information for the MDT measurement, or the feedback comprises a conflict indication indicating that the SN has triggered an existing MDT measurement, which is same as the MDT measurement, on the same terminal. In case the feedback comprises a confirmation of the configuration information for the MDT measurement, the feedback analyzer 322 may inform the MDT measurement executor 324 to execute the MDT measurement, e.g. via itself and the terminal, by sending an instruction to the MDT measurement executor 324. In case the feedback comprises a conflict indication indicating that the SN has triggered an existing MDT measurement same as the MDT measurement on the same terminal, the feedback analyzer 322 may inform the MDT measurement executor 324 to stop executing or not to execute the MDT measurement, by sending an instruction to the MDT measurement executor 324.

The MDT measurement executor 324 in this example may execute or stop executing the MDT measurement based on an instruction received from the feedback analyzer 322. In one embodiment, the MDT measurement executor 324 executes the MDT measurement based on the configuration information via a terminal in the wireless network, after receiving an instruction from the feedback analyzer 322 that indicates that a confirmation of the configuration information has been received from the SN. In another embodiment, the MDT measurement executor 324 stops the MDT measurement after receiving an instruction from the feedback analyzer 322 that indicates that a conflict indication has been received from the SN. When the MDT measurement includes different portions, the MDT measurement executor 324 may execute a first portion by itself, instruct the SN to execute a second portion, and instruct the terminal to execute a third portion. After the execution, the MDT measurement executor 324 may send the measurement result to the MDT result reporter 326 for reporting.

The MDT result reporter 326 in this example may receive the measurement result from the MDT measurement executor 324 and report it to the network management, e.g. a trace collection entity (TCE) device, of the wireless network. In one embodiment, the MDT result reporter 326 receives a first measurement result generated by the MDT measurement executor 324 that executes a first portion of the MDT measurement, and reports the first measurement result to the TCE of the wireless network. In another embodiment, the MDT result reporter 326 receives a second measurement result from the SN that executes a second portion of the MDT measurement to generate the second measurement result, and reports the second measurement result to the TCE of the wireless network. In yet another embodiment, the MDT result reporter 326 may also collect a third measurement result from the terminal that executes a third portion of the MDT measurement to generate the third measurement result, and reports the third measurement result to the TCE of the wireless network.

The configuration message analyzer 328 in this example may receive, via the receiver 314, a configuration message from the SN, and analyze the configuration message. For example, the configuration message comprises second configuration information for a second MDT measurement desired by the SN, where the second MDT measurement is same as the MDT measurement desired by the MN 300 and is to be executed on the same terminal in the wireless network. In one embodiment, the configuration message analyzer 328 may instruct the feedback generator 329 to generate a feedback to indicate an MDT conflict and ask the SN to stop the second MDT measurement. In another embodiment, the configuration message analyzer 328 may instruct the MDT measurement executor 324 to stop executing the MDT measurement desired by the MN 300, and instruct the feedback generator 329 to generate a feedback to instruct the SN to continue the second MDT measurement.

In one embodiment, after the MDT measurement configurator 320 transmits, via the receiver 314, the request for the MDT measurement to the SN to indicate the desire of the MN 300 to trigger the MDT measurement according to the configuration information, the configuration message analyzer 328 may receive a configuration message for the MDT measurement from the SN. While the request comprises first configuration information for the MDT measurement, the configuration message comprises second configuration information for the MDT measurement. The second configuration information may be the same as or different from the first configuration information. That is, the SN may either agree with or disagree with the MDT configuration desired by the MN 300. Based on the analysis result of the configuration message, the configuration message analyzer 328 may instruct the feedback generator 329 to generate a feedback.

The feedback generator 329 in this example may generate a feedback, in response to a request or configuration message from another node, and transmit, via the transmitter 312, the feedback to the node, e.g. the SN. In one embodiment, after the MN 300 receives second configuration information for a second MDT measurement desired by the SN, where the second MDT measurement is same as the MDT measurement desired by the MN 300 and is to be executed on the same terminal in the wireless network, the feedback generator 329 may transmit to the SN a feedback including a conflict indication in response to the second configuration information. The conflict indication indicates a conflict between the MDT measurement and the second MDT measurement to stop the second MDT measurement at the SN.

In another embodiment, after the MN 300 receives second configuration information for a second MDT measurement desired by the SN, where the second MDT measurement is same as the MDT measurement desired by the MN 300 and is to be executed on the same terminal in the wireless network, the feedback generator 329 may transmit to the SN a feedback including a confirmation of the second configuration information for the second MDT measurement to instruct the SN to continue the second MDT measurement.

In yet another embodiment, after the configuration message analyzer 328 receives the configuration message including second configuration information that may be the same as or different from the first configuration information, the feedback generator 329 transmits, via the transmitter 312 to the SN, a feedback in response to the configuration message. In one example, the second configuration information is the same as the first configuration information; and the feedback comprises a confirmation that the MDT measurement is to be executed based on the first configuration information, i.e. based on the second configuration information. In another example, the second configuration information is different from the first configuration information; and the feedback comprises a confirmation that the MDT measurement is to be executed based on the second configuration information.

The power module 308 can include a power source such as one or more batteries, and a power regulator, to provide regulated power to each of the above-described modules in FIG. 3. In some embodiments, if the MN 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the MN 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the feedback analyzer 322. Conversely, each of the modules illustrated in FIG. 3 can be implemented using a plurality of separate components or elements.

Figure 4:
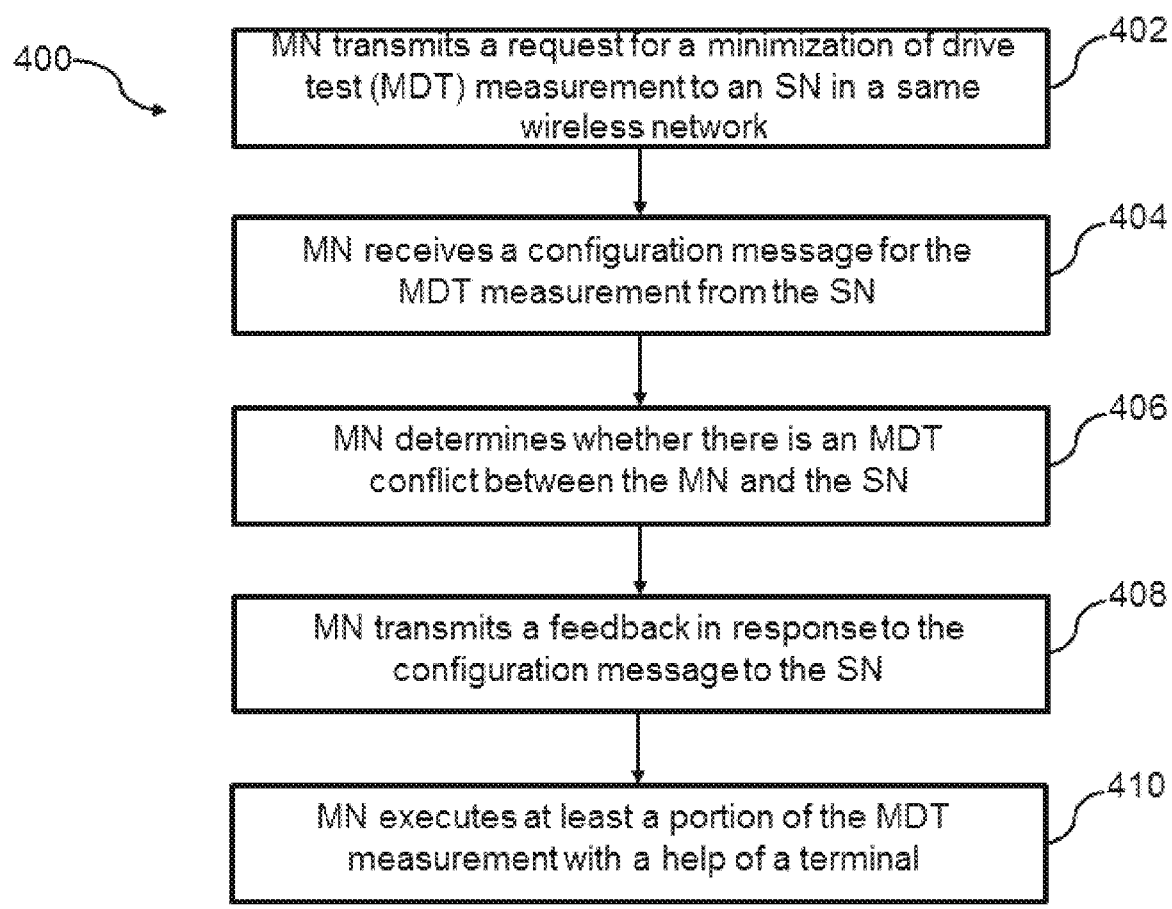
FIG. 4 illustrates a flow chart for a method performed by an MN for configuring minimization of drive test (MDT) under a multi-connectivity architecture, in accordance with some embodiments of the present disclosure.

FIG. 4 illustrates a flow chart for a method 400 performed by an MN, e.g. the MN 300 in FIG. 3, for configuring MDT under a multi-connectivity architecture, in accordance with some embodiments of the present disclosure. At operation 402, the MN transmits a request for an MDT measurement to an SN in a same wireless network under a multi-connectivity architecture. The MN receives at operation 404 a configuration message for the MDT measurement from the SN. The MN determines at operation 406 whether there is an MDT conflict between the MN and the SN. At operation 408, the MN transmits a feedback in response to the configuration message to the SN. Then the MN executes at operation 410 at least a portion of the MDT measurement with a help of a terminal.

Figure 5:
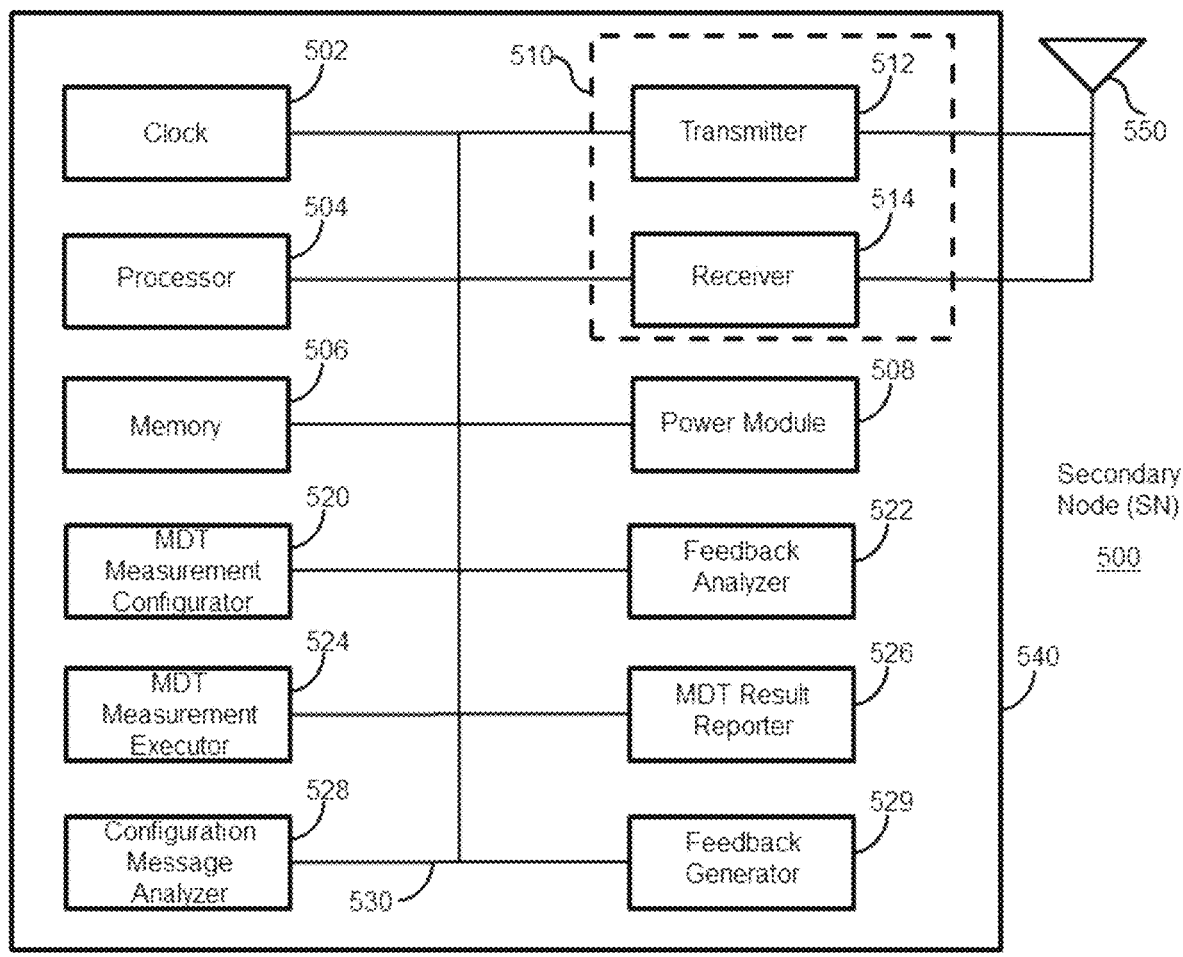
FIG. 5 illustrates a block diagram of a secondary node (SN), in accordance with some embodiments of the present disclosure.

FIG. 5 illustrates a block diagram of an SN 500, in accordance with some embodiments of the present disclosure. The SN 500 is an example of a node that can be configured to implement the various methods described herein. As shown in FIG. 5, the SN 500 includes a housing 540 containing a system clock 502, a processor 504, a memory 506, a transceiver 510 comprising a transmitter 512 and a receiver 514, a power module 508, an MDT measurement configurator 520, a feedback analyzer 522, an MDT measurement executor 524, an MDT result reporter 526, a configuration message analyzer 528, and a feedback generator 529.

In this embodiment, the system clock 502, the processor 504, the memory 506, the transceiver 510 and the power module 508 work similarly to the system clock 302, the processor 304, the memory 306, the transceiver 310 and the power module 308 in the MN 300. An antenna 550 or a multi-antenna array 550 is typically attached to the housing 540 and electrically coupled to the transceiver 510.

In one embodiment, the MDT measurement configurator 520 may work similarly to the MDT measurement configurator 320 in the MN 300, by proactively transmitting configuration information for an MDT measurement. In another embodiment, after or at the same time as the MDT measurement configurator 320 transmits to the SN 500 first configuration information for a first MDT measurement desired by the MN 300 on a terminal in the wireless network, the MDT measurement configurator 520 generates and transmits to the MN 300 second configuration information for a second MDT measurement desired by the SN 500. The two MDT measurements are the same and to be executed on the same terminal. In yet another embodiment, in response to a request from the MN 300 for an MDT measurement, the MDT measurement configurator 520 may generate and transmit to the MN 300 a configuration message for the MDT measurement. While the request comprises first configuration information for the MDT measurement, the configuration message comprises second configuration information for the MDT measurement. The second configuration information is the same as or different from the first configuration information.

In one embodiment, the feedback analyzer 522 may work similarly to the feedback analyzer 322 in the MN 300. In another embodiment, after the MDT measurement configurator 520 transmits to the MN 300 the second configuration information for the second MDT measurement, the feedback analyzer 522 receives, via the receiver 514 from the MN 300, a feedback in response to the second configuration information. The feedback may comprise either a conflict indication indicating a conflict between the MDT measurement desired by the MN 300 and the second MDT measurement desired by the SN 500 to stop the second MDT measurement, or a confirmation of the second configuration information to instruct continuation of the second MDT measurement. In yet another embodiment, after the MDT measurement configurator 520 transmits to the MN 300 the configuration message for the MDT measurement, the feedback analyzer 522 receives, via the receiver 514 from the MN 300, a feedback in response to the configuration message. The feedback comprises a confirmation that the MDT measurement is to be executed by the MN 300 based on either the first configuration information or the second configuration information.

In one embodiment, the MDT measurement executor 524 may work similarly to the MDT measurement executor 324 in the MN 300. In another embodiment, the MDT measurement executor 524 may execute a portion of the MDT measurement triggered by the MN 300. In yet another embodiment, due to an MDT conflict between the MN 300 and the SN 500, the MDT measurement executor 524 may stop the second MDT measurement desired by the SN 500. In still another embodiment, despite an MDT conflict between the MN 300 and the SN 500, the MDT measurement executor 524 executes the second MDT measurement desired by the SN 500 in response to a confirmation from the MN 300. The MDT measurement executor 524 may send the MDT measurement result to the MDT result reporter 526 or to the MN 300 for reporting.

In one embodiment, the MDT result reporter 526 may work similarly to the MDT result reporter 326 in the MN 300. In another embodiment, the MDT result reporter 526 may receive the measurement result generated by the MDT measurement executor 524 after executing the portion of the MDT measurement, and report the measurement result to the network management, e.g. a first TCE device, of the wireless network. In yet another embodiment, the MDT result reporter 526 may transmit, via the transmitter 512, the measurement result generated by the MDT measurement executor 524 to the MN 300, which will report the measurement result to a second TCE device, which may be the same as or different from the first TCE device. In still another embodiment, the MDT result reporter 526 receives a second measurement result from the MN 300 that executes another portion of the MDT measurement to generate the second measurement result. The MDT result reporter 526 may report the second measurement result to a third TCE of the wireless network.

In one embodiment, the configuration message analyzer 528 may work similarly to the configuration message analyzer 328 in the MN 300. In another embodiment, the configuration message analyzer 528 may receive, via the receiver 514 from the MN 300, configuration information for an MDT measurement to be executed on a terminal in the wireless network. The configuration message analyzer 528 may analyze the configuration information to determine that the MDT measurement comprises a first portion to be executed by the MN 300, a second portion to be executed by the SN 500, and a third portion to be executed by the terminal in the wireless network. The configuration message analyzer 528 may also analyze the configuration information to determine that the MDT measurement comprises information related to at least one of: measurement objects of the MDT measurement; measured values of the MDT measurement; a location measurement manner; link direction of the MDT measurement; a location measurement provider; trace collection entity device information; operator information; one or more MDT measurement collection locations; one or more network elements that report the MDT measurement result; measurement type of the MDT measurement; base station information that triggers the MDT measurement; and network management information of the base station that triggers the MDT measurement.

In yet another embodiment, the configuration message analyzer 528 receives, via the receiver 514 from the MN 300, a request for an MDT measurement. The configuration message analyzer 528 analyzes the request to determine that the request comprises first configuration information for the MDT measurement. The configuration message analyzer 528 may send the first configuration information to the MDT measurement configurator 520 for determining whether the SN 500 agrees with the first configuration information, i.e. whether there is an MDT conflict between the MN 300 and the SN 500.

In one embodiment, the feedback generator 529 may work similarly to the feedback generator 329 in the MN 300. In another embodiment, the feedback generator 529 may generate a feedback in response to the configuration information for the MDT measurement desired by the MN 300, and transmit the feedback via the transmitter 512 to the MN 300. In one example, the feedback comprises a confirmation of the configuration information for the MDT measurement to instruct the MN 300 to execute the MDT measurement based on the configuration information via a terminal in the wireless network. In another example, the feedback comprises a conflict indication indicating that the SN 500 has triggered an existing MDT measurement, which is same as the MDT measurement and to be executed on the same terminal. By transmitting this feedback, the SN 500 instructs the MN 300 to stop executing or not to execute the MDT measurement via the terminal in the wireless network.

It can be understood by one skilled in the art that the roles of the MN 300 and the SN 500 may be exchanged in accordance with various embodiments of the present teaching. The various modules discussed above are coupled together by a bus system 530. The bus system 530 can include a data bus and, for example, a power bus, a control signal bus, and/or a status signal bus in addition to the data bus. It is understood that the modules of the SN 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 504 can implement not only the functionality described above with respect to the processor 504, but also implement the functionality described above with respect to the configuration message analyzer 528. Conversely, each of the modules illustrated in FIG. 5 can be implemented using a plurality of separate components or elements.

Figure 6:
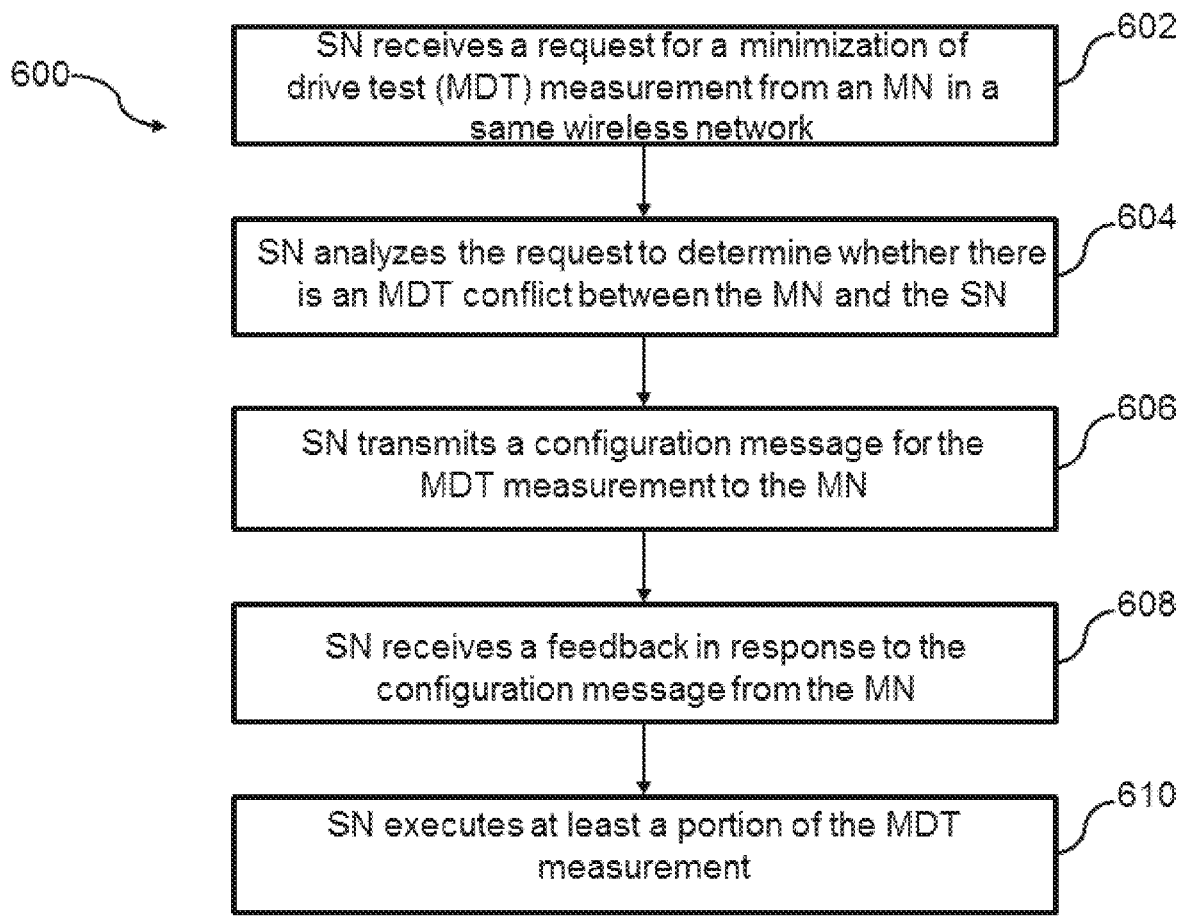
FIG. 6 illustrates a flow chart for a method performed by an SN for configuring MDT under a multi-connectivity architecture, in accordance with some embodiments of the present disclosure.

FIG. 6 illustrates a flow chart for a method 600 performed by an SN, e.g. the SN 500 in FIG. 5, for configuring MDT under a multi-connectivity architecture, in accordance with some embodiments of the present disclosure. At operation 602, the SN receives a request for an MDT measurement from an MN in a same wireless network under a multi-connectivity architecture. The SN analyzes at operation 604 the request to determine whether there is an MDT conflict between the MN and the SN. The SN transmits at operation 606 a configuration message for the MDT measurement to the MN. At operation 608, the SN receives a feedback in response to the configuration message from the MN. The SN executes at operation 610 at least a portion of the MDT measurement.

Different embodiments of the present disclosure will now be described in detail hereinafter. It is noted that the features of the embodiments and examples in the present disclosure may be combined with each other in any manner without conflict.

According to various embodiments of the present disclosure, a method is provided for configuring MDT under a multi-connectivity architecture. Each network element (NE) participating in the MDT can independently determine how to trigger the measurement. In addition to configuring the measurement configuration of the NE, each NE can also allocate part of the measurement to other NE configurations. For example, when an MN network element configures an M6 measurement (Packet Delay measurement) for a certain terminal, the MN may give the base station side measurement configuration of M6 to the MN base station to implement, and give the terminal side measurement of M6 to the terminal through the control plane of the SN, and give the positioning measurement configuration to the SN base station. After the measurement is completed, the SN collects the measurement results of the terminal and the SN base station and reports the measurement results to the MN according to the configuration information, or collects the measurement results of the terminal and the SN base station according to the configuration and reports the measurement results to the TCE device. Therefore, the method provides that the network element that triggers the MDT transmits the MDT configuration information to the base station that executes the MDT through the inter-base station interface, and the base station that needs to execute the MDT performs the measurement.

Figure 7:
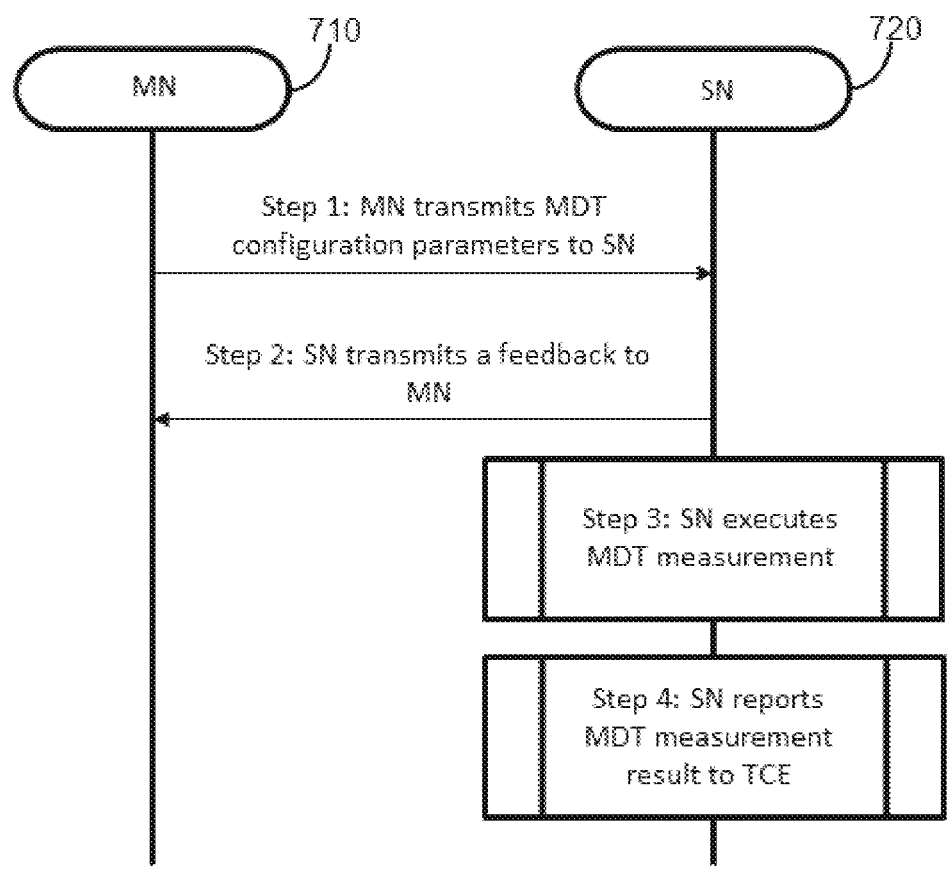
FIG. 7 illustrates an exemplary method for configuring MDT under a multi-connectivity architecture, in accordance with an embodiment of the present disclosure.

FIG. 7 illustrates an exemplary method for configuring MDT under a multi-connectivity architecture, in accordance with a first embodiment of the present disclosure. As shown in FIG. 7, the MN 710 transmits the MDT configuration to the SN 720 and the SN 720 performs the MDT according to the configuration. After the measurement is completed, the SN 720 transmits the measurement report directly to TCE. In an alternative embodiment, the SN receives a signaling sent from the core network, where the signaling includes a configuration message for the MDT. Then the SN transmits the configuration to the MN. After the measurement at the MN, the MN transmits the report directly to TCE. The triggered measurement may be a signaling-based MDT measurement or a management-based MDT measurement.

In the first embodiment as shown in FIG. 7, The MN 710 transmits at Step 1 the MDT measurement configuration information, e.g. configuration parameters, to the SN 720. The MN 710 triggers the MDT measurement. The trigger may be due to signaling-based MDT measurement and/or management-based MDT measurement. In this example, the MN 710 determines to have the MDT measurement. The MN 710 determined that the SN 720 undertakes the measuring task. The MN 710 transmits a message to the SN 720 through inter-base station interface messages, such as an XN interface, an X2 interface, etc. The message can be a modification based on an existing message, or it can be a new message.

The MDT measurement configuration parameters may include one or a combination of the following parameters: measured values (including M1, M2, M3, M4, M5, M6, M7); measurement objects (including the MCG bearer, the SCG bearer, the SCG RLC bearer of split bearer, the MCG RLC bearer of split bearer, the QCI, all the bearers of the UE, flow ID, slice information (e.g., S-NSSAI, etc.)); location measurement manner (E-CID, GPS, Bluetooth, Wi-Fi); link direction of the MDT measurement (uplink measurement, downlink measurement); location measurement provider (terminal or base station); TCE device information (TCE identifier, TCE address); operator Information (PLMN ID); measurement collection location (designated MN network element, designated SN network element, separate collection); NEs to which the measurement result is reported to or NEs that report the MDT measurement result (designated MN NEs, designated SN NEs, separate report); measurement type (management-based MDT measurement, signaling-based MDT measurement); base station information (e.g., gNB ID) that triggers the measurement; and network management information (such as DNS information or address information of the network management) of the base station that triggers the measurement. The parameters may be configured in a combined form to an SN network element. For example, to enable the SN network element to directly report the measurement result to the correct TCE device, when configuring the parameters, the MN may transmit the TCE device information (such as address information and TCE device number) to the SN network element. Based on this information, the SN can transmit the report to the correct TCE device. For example, to enable the TCE network element to correctly identify which network element triggered the measurement result, the MN network element may transmit its own device information (for example, the base station number, e.g., the DNS information of the base station network management system) to the SN. When the SN transmits the report to the TCE, the report includes the MN network element equipment information as well, so that the TCE equipment can statistically determine that the received measurement report is due to an MDT measurement triggered by which network element.

The SN 720 at Step 2 transmits a feedback message for performing the MDT measurement desired by the MN 710. At Step 3, the SN 720 and/or the terminal perform the MDT measurement, and the SN 720 is responsible for collecting the MDT measurement results. At Step 4, after the SN 720 finishes the measurement, the SN 720 reports the measurement result to the TCE device according to the configuration.

Figure 8:
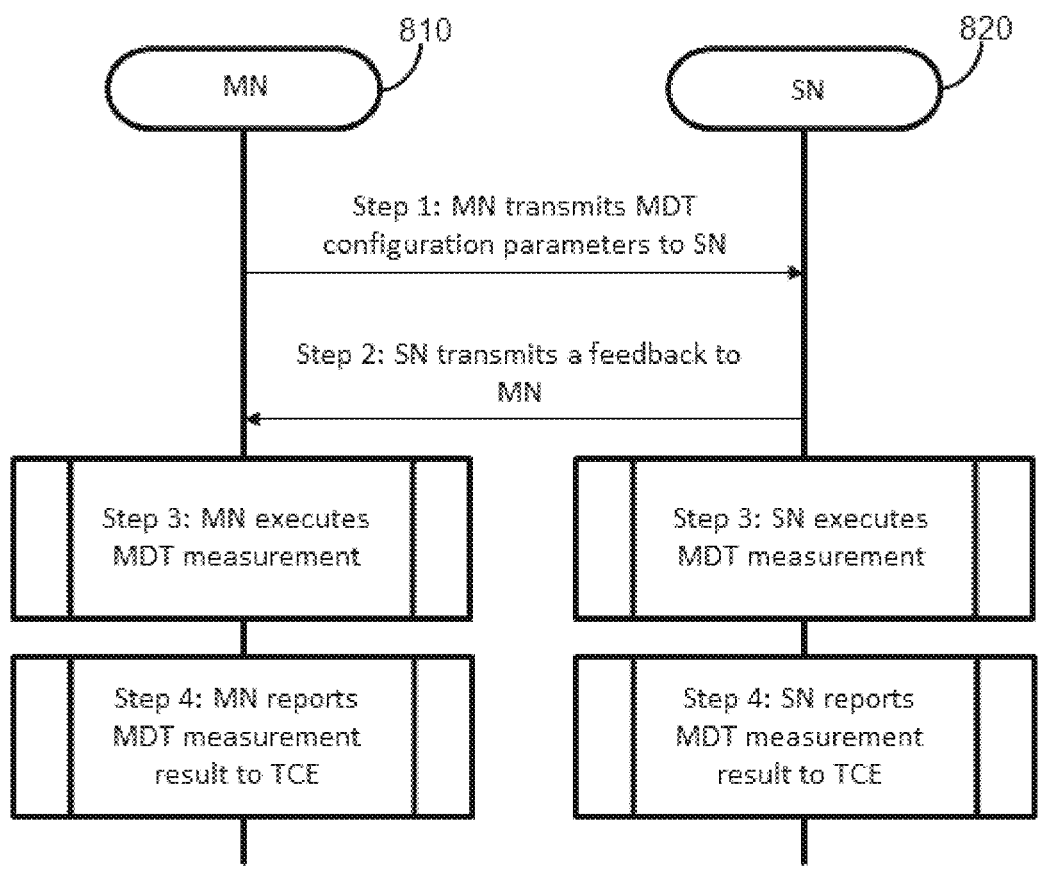
FIG. 8 illustrates another exemplary method for configuring MDT under a multi-connectivity architecture, in accordance with an embodiment of the present disclosure.

FIG. 8 illustrates another exemplary method for configuring MDT under a multi-connectivity architecture, in accordance with a second embodiment of the present disclosure. In the second embodiment, the PDCP layer of the split bearer is on the SN network element. The MN decomposes the measurement into three parts (the measurement part performed by MN, the measurement part performed by the terminal, and the measurement part performed by SN). The MN transmits the MDT measurement configuration to the terminal for performing the measurement. The MN itself performs the measurement, and at the same time the MN transmits the MDT configuration to the SN, which performs the measurement as well. After the measurement is completed, the MN side is responsible for collecting the measurement result at the MN side and reporting it to a first TCE. The SN is responsible for collecting the measurement result at the SN side and reporting it to a second TCE, which may be the same as or different from the first TCE. Each MDT measurement has a trace ID, e.g. in terms of a UE ID, time etc., that identifies the MDT measurement. Each report of the measurement result carries a trace ID of the MDT measurement and identifies the MDT measurement was performed by which UE, at which time, at which location, with what measurement parameters, etc.

As shown in FIG. 8, at Step 1, the MN 810 transmits the MDT measurement configuration to the SN 820. The MN 810 triggers MDT measurement. The difference from the first embodiment is that the MN 810 can decompose the MDT measurement into three parts, which include the MN network element measurement part, the SN network element measurement part, and the terminal measurement part. The MN 810 measures the primary node RLC bearers under the branch bearers. The SN 820 measures the secondary node RLC bearers under the branch bearers, and the terminal measures the location information. The difference from the Step 1 of the first embodiment is that the MN 810 transmits the MDT measurement configuration parameters of the SN network element measurement part to the SN network element. The MDT measurement configuration parameters include the various parameters described above. The parameters may be configured in a combined form to the SN network element. The terminal measurement part may also be configured by the SN 820 to the terminal.

At Step 2, the SN 820 transmits a feedback message regarding performing MDT measurement to the MN base station. The SN performs MDT measurement configured by the MN and transmits a feedback message to the MN base station. At Step 3, the MN 810 and the SN 820 and the terminal respectively perform measurements. The MN 810 is responsible for the MN network element measurement part, and the MN 810 is responsible for collecting the measurement results of the MN network element measurement part and/or the terminal measurement part. The SN 820 is responsible for SN network element measurement part, and the SN 820 is responsible for collecting the measurement results of the SN network element measurement part and/or the terminal measurement part. At Step 4, after the measurement is completed, the MN 810 and the SN 820 respectively report the measurement results to the TCE device. In order for a TCE device to recognize whether measurement reports from different devices belong to the same MDT measurement, the MN and the SN may carry some auxiliary information when reporting the result. The TCE can associate the measurement results respectively reported by the MN and the SN according to the auxiliary information. Such auxiliary information includes: the information of the terminal, the time of measurement, the number of the measurement, etc.

In a third embodiment, after the measurement is completed, the SN reports the measurement results to the MN, and the MN reports the measurement results together or as an aggregation to the TCE device. The measurement results may use standardized inter-base-station interfaces, such as Xn, X2 interfaces, or inter-base station IP connections.

There may be an MDT conflict under a multi-connectivity architecture, e.g. when multiple network elements respectively perform a same type of measurement at a same UE. For example, the MN network element triggers a signaling-based MDT measurement for a certain terminal, while at the same time the network management of the SN base station triggers a management-based MDT measurement for the same terminal. As such, the MN and the SN select the same measurement of the same terminal. This can be solved through negotiation between the base stations. For example, when a certain service of a terminal is being measured by the MN, the SN also chooses to measure the same service of the terminal. At this time, the MN is responsible for resolving the conflict. The SN transmits the measurement configuration (including TCE, PLMN, measurement object, etc.) established at the SN side to the MN before performing the measurement. If the MN does not find any conflict, the SN will start measurement after a confirmation feedback is returned. If the MN finds a conflict, a measurement conflict indication may be carried in the feedback message. After receiving the measurement conflict indication, the SN will not continue the measurement.

The MDT triggered by the MN or the SN may be signaling-based MDT measurement and management-based MDT measurement. This may be similar to the two measurement trigger modes referred in 3GPP TS 37.320 protocol. The signaling-based MDT measurement means that the MN base station receives the measurement configuration message sent by the network management of the core network. The measurement configuration message explicitly indicates MDT measurement for a specific terminal, and the measurement parameters may be configured by the core network. The base station performs MDT according to configuration of the core network. The management-based MDT measurement means that the network management of the MN network element or the SN network element requests the access network element to select a suitable terminal for MDT measurement. The MN or SN will select one or more terminals, and perform the MDT measurement according to the requirements of the network management.

The message via which the MN and the SN transmit the MDT measurement configuration information may use an inter-base station control plane interface such as an XN or an X2 interface, with reference to the 3GPP TS 38.423 protocol or the TS 36.423 protocol. The message may reuse existing inter-base station interface messages or use new inter-base station interface messages. Reusing interface messages can be SGNB ADDITION REQUEST, SGNB MODIFICATION REQUIRED and other messages. Reusing methods include adding new fields. The measurement report sent by the MN and the SN may use an inter-base station control plane interface such as Xn or X2 or use a data plane interface. For example, the measurement report may be transmitted through an IP data link.

Figure 9:
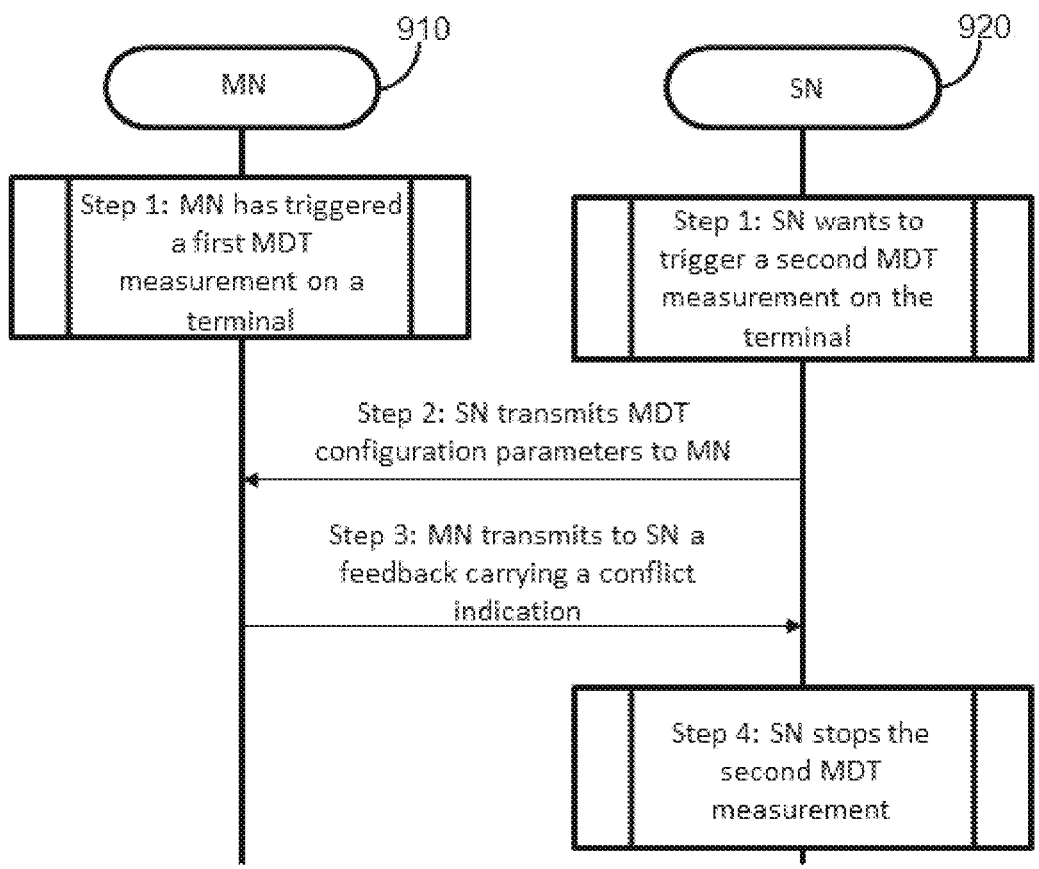
FIG. 9 illustrates an exemplary method for configuring MDT under a multi-connectivity architecture to avoid a conflict between the MN and the SN, in accordance with an embodiment of the present disclosure.

FIG. 9 illustrates an exemplary method for configuring MDT under a multi-connectivity architecture to avoid a conflict between the MN and the SN, in accordance with a fourth embodiment of the present disclosure. The MN and the SN trigger measurements simultaneously, which causes measurement conflicts. The MN and the SN network elements make their own decisions independently, and the same measurement objects of the same terminal are selected. Before implementing the measurement, the SN transmits the MDT configuration to the MN network element. At this time, the MN starts to measure the same measurement object of the same terminal. The MN network element indicates a conflict in the feedback message, and the SN stops performing the measurement.

As shown in FIG. 9, at Step 1, the MN 910 has triggered a first MDT measurement on a terminal. Also at Step 1, the SN 920 wants to trigger a second MDT measurement on the terminal as well. At Step 2, the SN 920 transmits the MDT configuration of the second MDT to the MN 910. In this embodiment, the SN network element determines the MDT measurement for a certain terminal. But the MDT measurement has been performed at the MN network element. Before triggering the MDT measurement, the SN transmits the MDT configuration to the MN network element to confirm that there is no conflict. At Step 3, the MN 910 transmits a feedback message to the SN 920. The feedback message carries a measurement conflict indication. At Step 4, the SN 920 stops the second MDT measurement after receiving the conflict indication.

In a fifth embodiment, the MN and the SN trigger MDT measurements simultaneously, which causes measurement conflicts. The MN and the SN network elements make their own decisions independently, and the same measurement objects of the same terminal are selected. Before performing the measurement, the MN transmits the MDT configuration to the SN network element. The SN network element now has started to measure the same measurement objects of the same terminal. The SN network element indicates a conflict in the feedback message, and the MN network element stops performing the measurement. Unlike the fourth embodiment, the MN stops the MDT measurement in this embodiment.

Figure 10:
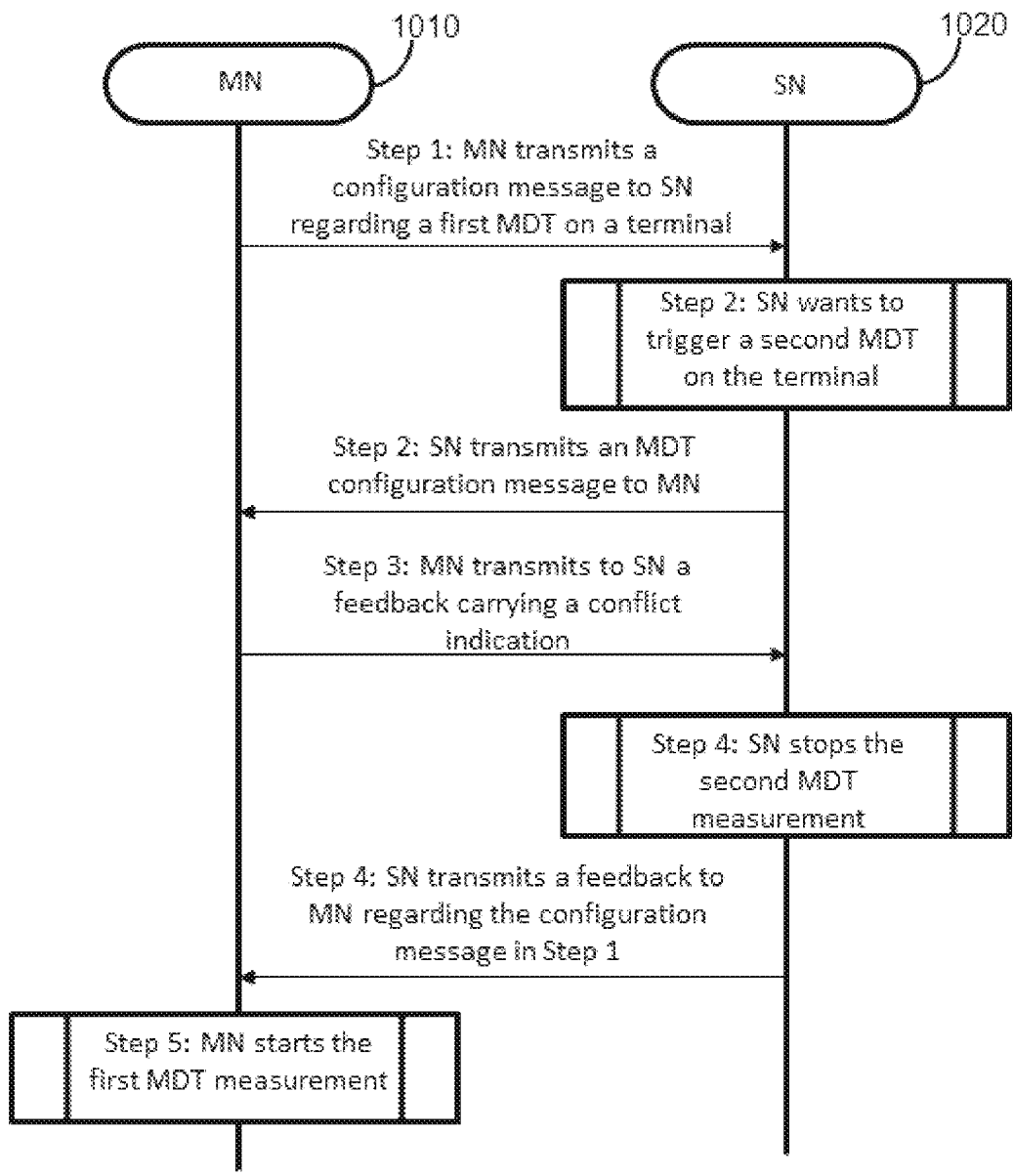
FIG. 10 illustrates another exemplary method for configuring MDT under a multi-connectivity architecture to avoid a conflict between the MN and the SN, in accordance with an embodiment of the present disclosure.

FIG. 10 illustrates another exemplary method for configuring MDT under a multi-connectivity architecture to avoid a conflict between the MN and the SN, in accordance with a sixth embodiment of the present disclosure. The MN and the SN trigger measurements simultaneously, which causes measurement conflicts. The MN and the SN network elements make their own decisions independently, and the same measurement objects of the same terminal are selected. Eventually the MDT measurement triggered by the MN is performed. Before performing measurement, the MN transmits the MDT configuration to the SN network element. Before receiving the feedback message, the MN receives from the SN a measurement request for the same measurement objects of the same terminal. The MN returns a conflict indication and continues to perform the measurement. The SN terminates the measurement.

As shown in FIG. 10, at Step 1, before performing a first MDT measurement on a terminal, the MN 1010 transmits the MDT measurement configuration of the first MDT to the SN 1020. At Step 2, the SN 1020 wants to trigger a second MDT on the same terminal. As such, within Step 2, the MN 1010 receives the MDT measurement configuration message of the second MDT sent by the SN 1020 before receiving the feedback message. It can be understood that the orders of the Step 1 and the Step 2 can be exchanged or the Step 1 and the Step 2 may happen at the same time.

Through the configuration message from the SN 1020, the MN 1010 can learn that the MDT measurement that the SN 1020 wishes to measure has been performed on the MN 1010. At Step 3, the MN 1010 transmits a feedback message to the SN 1020. The feedback message carries a measurement conflict indication. After receiving the feedback message, the SN 1020 learns that its desired second MDT measurement is also going to be performed on the MN 1010. Therefore, the SN 1020 terminates at Step 4 the desired second MDT measurement. Also at Step 4, the MN 1010 receives a feedback message returned by the SN 1020. The MN 1010 performs at Step 5 the first MDT measurement. In an alternative embodiment, after transmitting the configuration message in Step 1, the MN 1010 can also start the first MDT measurement directly. In another embodiment, the MDT measurement triggered by the SN is performed eventually when there is an MDT conflict between the MN and the SN.

Figure 11:
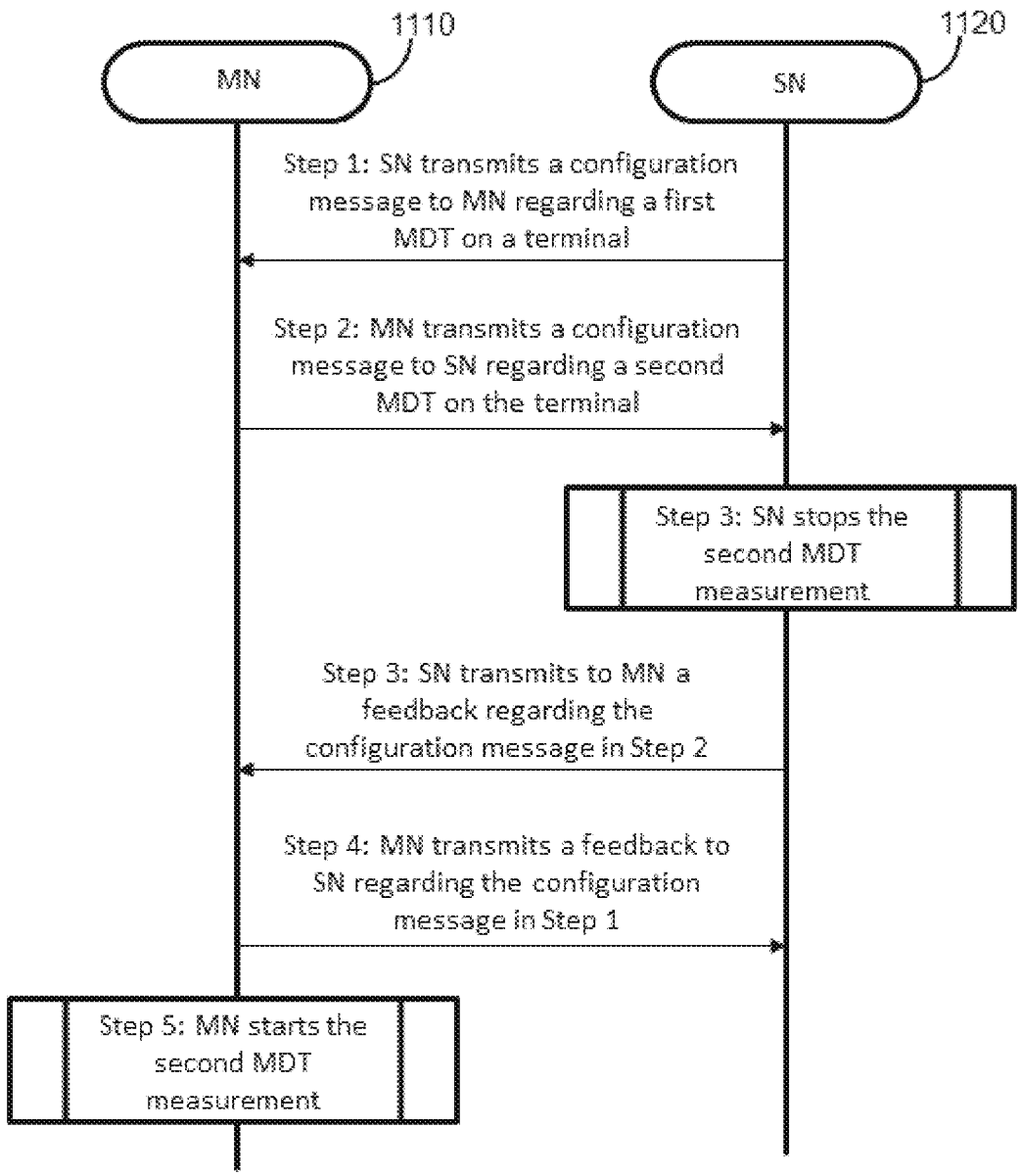
FIG. 11 illustrates yet another exemplary method for configuring MDT under a multi-connectivity architecture to avoid a conflict between the MN and the SN, in accordance with an embodiment of the present disclosure.

FIG. 11 illustrates yet another exemplary method for configuring MDT under a multi-connectivity architecture to avoid a conflict between the MN and the SN, in accordance with a seventh embodiment of the present disclosure. The MN and the SN trigger measurements simultaneously, which causes measurement conflicts. The MN and the SN network elements make their own decisions independently, and the same measurement objects of the same terminal are selected. Eventually the MDT measurement triggered by the MN is performed. The SN transmits the MDT configuration to the MN before the measurement is performed. Before receiving the feedback message, the SN receives from the MN a measurement request for the same measurement objects of the same terminal. The SN returns a conflict indication and terminates the measurement.

As shown in FIG. 11, at Step 1, the SN 1120 transmits an MDT measurement configuration regarding a first MDT to the MN 1110 before performing the first MDT measurement on a terminal. At Step 2, the SN 1120 receives an MDT measurement configuration message regarding a second MDT on the terminal sent by the MN 1110 before receiving the feedback message. It can be understood that the orders of the Step 1 and the Step 2 can be exchanged or the Step 1 and the Step 2 may happen at the same time.

Based on the feedback message, the SN 1120 can learn that there is a conflict between the MDT measurement that the SN 1120 desires to measure and the MDT measurement that the MN 1110 desires to measure. The SN 1120 terminates its desired MDT measurement at Step 3. Also at Step 3, the SN 1120 transmits a feedback message to the MN 1110. The feedback message may or may not carry a measurement conflict indication. This is because after receiving the feedback message, the SN 1120 learns that its desired MDT measurement is also going to be performed on the MN 1110. Therefore, the SN 1110 terminates its desired MDT measurement. But this may not be necessary for the MN 1110 to know. At Step 4, the MN 1110 transmits to the SN 1120 a feedback message regarding the configuration message sent by the SN 1120 in Step 1. The MN 1110 performs at Step 5 the second MDT measurement. In another embodiment, the MDT measurement triggered by the SN is performed eventually when there is an MDT conflict between the MN and the SN.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A method performed by a first wireless communication node being or comprising a first base station, the method comprising:
   transmitting, to a second wireless communication node being or comprising a second base station, configuration information for a minimization of drive test, MDT, measurement, wherein the first wireless communication node and the second wireless communication node are both nodes in a wireless network, and wherein the MDT measurement is to be executed by a wireless communication device in the wireless network;
   receiving, from the second wireless communication node, a feedback in response to the configuration information for the MDT measurement, the feedback comprising a conflict indication indicating that the second wireless communication node has triggered an existing MDT measurement, which is same as the MDT measurement, on the wireless communication device; and
   stopping the MDT measurement at the first wireless communication node in response to the feedback.

2. The method of claim 1, wherein:
   the feedback comprises a confirmation of the configuration information for the MDT measurement; and
   the method further comprises executing the MDT measurement based on the configuration information via the wireless communication device in the wireless network.

3. The method of claim 1, wherein:
   the MDT measurement comprises a first portion to be executed by the first wireless communication node, a second portion to be executed by the second wireless communication node, and a third portion to be executed by the wireless communication device in the wireless network;
   the second wireless communication node executes the second portion of the MDT measurement to generate a second measurement result; and
   the method further comprises:
   executing the first portion of the MDT measurement to generate a first measurement result,
   reporting the first measurement result to a trace collection entity of the wireless network,
   receiving the second measurement result from the second wireless communication node, and
   reporting the second measurement result to a trace collection entity of the wireless network.

4. The method of claim 1, further comprising:
   receiving, from the second wireless communication node, second configuration information for a second MDT measurement to be executed on the wireless communication device in the wireless network, wherein the MDT measurement is same as the second MDT measurement and to be executed on the wireless communication device; and transmitting, to the second wireless communication node, a conflict indication in response to the second configuration information, wherein the conflict indication indicates a conflict between the MDT measurement and the second MDT measurement to stop the second MDT measurement at the second wireless communication node, or
   receiving, from the second wireless communication node, second configuration information for a second MDT measurement to be executed on the wireless communication device in the wireless network, wherein the MDT measurement is same as the second MDT measurement and to be executed on the wireless communication device; stopping the MDT measurement at the first wireless communication node, and transmitting, to the second wireless communication node, a second feedback in response to the second configuration information, wherein the second feedback comprises a confirmation of the second configuration information for the second MDT measurement to instruct the second wireless communication node to continue the second MDT measurement.

5. The method of claim 1, wherein the configuration information for the MDT measurement comprises information related to at least one of: measurement objects of the MDT measurement; measured values of the MDT measurement; a location measurement manner; link direction of the MDT measurement; a location measurement provider; trace collection entity device information; operator information; one or more MDT measurement collection locations; one or more network elements that report the MDT measurement result; measurement type of the MDT measurement; base station information that triggers the MDT measurement; and network management information of the base station information that triggers the MDT measurement.

6. A wireless communication node configured to carry out the method of claim 1.

7. A non-transitory computer-readable medium having stored thereon computer-executable instructions for carrying out the method of claim 1.

8. A method performed by a first wireless communication node being or comprising a first base station, the method comprising:
   transmitting, to a second wireless communication node being or comprising a second base station, a request for a minimization of drive test, MDT, measurement, wherein the first wireless communication node and the second wireless communication node are both nodes in a wireless network, and wherein the MDT measurement is to be executed by a wireless communication device in the wireless network;
   receiving, from the second wireless communication node, a configuration message for the MDT measurement; and
   transmitting, to the second wireless communication node, a feedback in response to the configuration message, the feedback comprising a conflict indication indicating that the first wireless communication node has triggered an existing MDT measurement, which is same as the MDT measurement, on the wireless communication device, wherein the second wireless communication node stops the MDT measurement at the second wireless communication node in response to the feedback.

9. The method of claim 8, wherein:

the request comprises first configuration information for the MDT measurement;

the configuration message comprises second configuration information for the MDT measurement; and the second configuration information is same as the first configuration information and the feedback comprises a confirmation that the MDT measurement is to be executed based on the first configuration information, or the second configuration information is different from the first configuration information and the feedback comprises a confirmation that the MDT measurement is to be executed based on the second configuration information.

10. A method performed by a first wireless communication node being or comprising a first base station, the method comprising:

receiving, from a second wireless communication node being or comprising a second base station, configuration information for a minimization of drive test, MDT, measurement, wherein the first wireless communication node and the second wireless communication node are both nodes in a wireless network; and transmitting, to the second wireless communication node, a feedback in response to the configuration information for the MDT measurement, wherein the feedback comprises a confirmation of the configuration information for the MDT measurement and the second wireless communication node executes the MDT measurement based on the configuration information via a wireless communication device in the wireless network, or wherein the MDT measurement is executed by a wireless communication device in the wireless network;

the feedback comprises a conflict indication indicating that the first wireless communication node has triggered an existing MDT measurement, which is same as the MDT measurement, on the wireless communication device; and the second wireless communication node stops the MDT measurement in response to the feedback.

11. The method of claim 10, wherein:

the MDT measurement comprises a first portion to be executed by the first wireless communication node, a second portion to be executed by the second wireless communication node, and a third portion to be executed by the wireless communication device in the wireless network;

the second wireless communication node executes the second portion of the MDT measurement to generate a second measurement result; and the method further comprises:

executing the first portion of the MDT measurement to generate a first measurement result, and reporting the first measurement result to a trace collection entity of the wireless network, receiving the second measurement result from the second wireless communication node, and reporting the second measurement result to a trace collection entity of the wireless network.

12. The method of claim 10, further comprising:

transmitting, to the second wireless communication node, second configuration information for a second MDT measurement to be executed on the wireless communication device in the wireless network, wherein the MDT measurement is same as the second MDT measurement and to be executed on the wireless communication device; receiving, from the second wireless communication node, a conflict indication in response to the second configuration information, wherein the conflict indication indicates a conflict between the MDT measurement and the second MDT measurement; and stopping the second MDT measurement in response to the conflict indication, or transmitting, to the second wireless communication node, second configuration information for a second MDT measurement to be executed on the wireless communication device in the wireless network, wherein the MDT measurement is same as the second MDT measurement and to be executed on the wireless communication device; receiving, from the second wireless communication node, a second feedback in response to the second configuration information, wherein the second feedback comprises a confirmation of the second configuration information for the second MDT measurement; and executing, via the wireless communication device, the second MDT measurement based on the second configuration information.

13. The method of claim 10, wherein the configuration information for the MDT measurement comprises information related to at least one of: measurement objects of the MDT measurement; measured values of the MDT measurement; a location measurement manner; link direction of the MDT measurement; a location measurement provider; trace collection entity device information; operator information; one or more MDT measurement collection locations; one or more network elements that report the MDT measurement result; measurement type of the MDT measurement; base station information that triggers the MDT measurement; and network management information of the base station information that triggers the MDT measurement.

14. A wireless communication node configured to carry out the method of claim 10.

15. A non-transitory computer-readable medium having stored thereon computer-executable instructions for carrying out the method of claim 10.

16. A method performed by a first wireless communication node being or comprising a first base station, the method comprising:

receiving, from a second wireless communication node being or comprising a second base station, a request for a minimization of drive test (MDT) measurement, wherein the first wireless communication node and the second wireless communication node are both nodes in a wireless network;

transmitting, to the second wireless communication node, a configuration message for the MDT measurement, and wherein the MDT measurement is to be executed by a wireless communication device in the wireless network;

receiving, from the second wireless communication node, a feedback in response to the configuration message, the feedback comprising a conflict indication indicating that the second wireless communication node has triggered an existing MDT measurement, which is same as the MDT measurement, on the wireless communication device; and stopping the MDT measurement at the first wireless communication node in response to the feedback.

17. The method of claim 16, wherein:

the request comprises first configuration information for the MDT measurement;

the configuration message comprises second configuration information for the MDT measurement; and wherein the second configuration information is same as the first configuration information and the feedback comprises a confirmation that the MDT measurement is to be executed based on the first configuration information, or wherein the second configuration information is different from the first configuration information and the feedback comprises a confirmation that the MDT measurement is to be executed based on the second configuration information.

18. A wireless communication node configured to carry out the method of claim 1.

* * * * *